(12) United States Patent
Thomas

(10) Patent No.: US 8,312,669 B2
(45) Date of Patent: Nov. 20, 2012

(54) FISHING LURE HAVING RECORDED BAIT SOUND PLAYBACK MODULE

(76) Inventor: Kenneth Dale Thomas, Kalaheo, HI (US)

(*) Notice: Subject to any disclaimer, the term of this patent is extended or adjusted under 35 U.S.C. 154(b) by 0 days.

(21) Appl. No.: 13/239,284

(22) Filed: Sep. 21, 2011

(65) Prior Publication Data

US 2012/0005940 A1 Jan. 12, 2012

Related U.S. Application Data

(63) Continuation-in-part of application No. 12/171,917, filed on Jul. 11, 2008, now abandoned, and a continuation-in-part of application No. 12/562,914, filed on Sep. 18, 2009, now abandoned, and a continuation-in-part of application No. 12/945,193, filed on Nov. 12, 2010, now abandoned, and a continuation-in-part of application No. 13/189,548, filed on Jul. 24, 2011.

(51) Int. Cl.
*A01K 85/01* (2006.01)
(52) U.S. Cl. ..................... 43/42.31; 43/17.1
(58) Field of Classification Search .............. 43/26.2, 43/42.31, 26.1, 42.3, 17.1
See application file for complete search history.

(56) References Cited

U.S. PATENT DOCUMENTS

| | | | | |
|---|---|---|---|---|
| 638,885 A | * | 12/1899 | Peterson et al. | 43/26.2 |
| 941,911 A | * | 11/1909 | Burthe | 43/42.02 |
| 1,857,312 A | * | 5/1932 | Kuehn | 43/42.02 |
| 1,906,791 A | * | 5/1933 | Grossmann | 43/26.2 |
| 2,472,505 A | * | 6/1949 | Yocam et al. | 43/26.2 |
| 2,478,655 A | * | 8/1949 | Davis | 43/26.2 |
| 2,534,639 A | * | 12/1950 | Twist | 43/26.2 |
| 2,555,802 A | * | 6/1951 | Martin | 43/26.2 |
| 2,559,475 A | * | 7/1951 | Sparkman | 43/26.2 |
| 2,724,205 A | * | 11/1955 | Howard | 43/26.2 |
| 2,867,933 A | * | 1/1959 | Stookey | 43/42.02 |
| 2,891,343 A | * | 6/1959 | Dominic | 43/26.2 |
| 3,105,317 A | * | 10/1963 | Fox | 43/26.2 |
| 3,235,999 A | * | 2/1966 | Wieszeck | 43/26.2 |
| 3,457,667 A | * | 7/1969 | Tripp | 43/26.2 |
| 3,465,464 A | * | 9/1969 | Berry | 43/26.2 |
| 3,466,784 A | * | 9/1969 | Bonner | 43/26.1 |
| 3,505,753 A | * | 4/1970 | Henderson | 43/26.2 |
| 3,791,064 A | * | 2/1974 | Van Iseghem, Jr. | 43/26.2 |
| 3,841,012 A | * | 10/1974 | Maled | 43/26.2 |
| 4,038,773 A | * | 8/1977 | Castelletti et al. | 43/26.2 |
| 4,133,135 A | * | 1/1979 | Miles | 43/42.13 |
| 4,177,597 A | * | 12/1979 | Thomassin | 43/42.3 |
| 4,223,467 A | * | 9/1980 | Hodges et al. | 43/42.31 |
| 4,380,132 A | * | 4/1983 | Atkinson | 43/26.2 |

(Continued)

FOREIGN PATENT DOCUMENTS

DE 19512031 A1 * 10/1996

(Continued)

*Primary Examiner* — Darren W Ark
(74) *Attorney, Agent, or Firm* — Schultz & Associates, P.C.

(57) ABSTRACT

An electronic sound module in a fishing lure in the water is activated by a fisherman on the shore to broadcast a prerecorded actual or simulated sound of a bait creature. In a preferred embodiment, a motion sensor in the sound module activates the sound chip and micro speaker when the fisherman tugs on the line, a water sensing automatic on-off switch turns the power on and off, and the battery is charged by an external charging coil. An alternate embodiment remote radio controlled robotic fishing lure device replicates bait animals in size, shape, movement and sound.

1 Claim, 16 Drawing Sheets

U.S. PATENT DOCUMENTS

| | | | | |
|---|---|---|---|---|
| 4,468,879 A * | 9/1984 | Anson | | 43/42.06 |
| 4,581,841 A * | 4/1986 | Gish | | 43/26.2 |
| 4,594,806 A * | 6/1986 | Brown | | 43/42.18 |
| 4,669,213 A * | 6/1987 | LeRoy | | 43/17.6 |
| 4,676,020 A * | 6/1987 | Taylor et al. | | 43/42.02 |
| 4,700,501 A * | 10/1987 | Bryan | | 43/26.1 |
| 4,765,084 A * | 8/1988 | Braden | | 43/34 |
| 4,805,339 A * | 2/1989 | Fuentes et al. | | 43/42.31 |
| 4,831,767 A * | 5/1989 | Pearce | | 43/26.2 |
| 4,858,370 A * | 8/1989 | Ryder | | 43/43.13 |
| 4,884,359 A * | 12/1989 | Wray | | 43/42.19 |
| 4,922,647 A * | 5/1990 | Tompkins | | 43/42.44 |
| 4,980,987 A * | 1/1991 | Ramsey, Sr. | | 43/42.02 |
| 5,035,075 A * | 7/1991 | Pearce | | 43/26.2 |
| 5,077,929 A * | 1/1992 | Khan | | 43/26.1 |
| 5,086,581 A * | 2/1992 | Barra et al. | | 43/26.1 |
| 5,088,227 A * | 2/1992 | Toner et al. | | 43/42.3 |
| 5,105,573 A * | 4/1992 | Mays | | 43/26.2 |
| 5,111,609 A * | 5/1992 | Flo | | 43/26.1 |
| 5,165,193 A * | 11/1992 | Dankwardt | | 43/26.1 |
| 5,172,510 A * | 12/1992 | Lovell, Jr. | | 43/42.36 |
| 5,203,103 A * | 4/1993 | Hawley | | 43/17.1 |
| 5,309,664 A * | 5/1994 | Wright | | 43/26.1 |
| 5,321,905 A * | 6/1994 | Higgins | | 43/42.03 |
| 5,331,760 A * | 7/1994 | DuMont | | 43/17.1 |
| 5,485,697 A * | 1/1996 | Watson et al. | | 43/42.31 |
| 5,535,538 A * | 7/1996 | Heuke | | 43/26.1 |
| 5,694,714 A * | 12/1997 | Basso et al. | | 43/26.2 |
| 5,697,182 A * | 12/1997 | Rodgers | | 43/42.31 |
| 5,875,582 A * | 3/1999 | Ratzlaff et al. | | 43/26.1 |
| 5,894,692 A * | 4/1999 | Firmin | | 43/42.02 |
| 5,924,236 A * | 7/1999 | Preston | | 43/42.31 |
| 6,000,165 A * | 12/1999 | Van Iseghem, Jr. | | 43/26.2 |
| 6,035,574 A * | 3/2000 | Ware | | 43/42.31 |
| 6,050,022 A * | 4/2000 | Brick | | 43/26.2 |
| 6,058,644 A * | 5/2000 | Irwin et al. | | 43/26.2 |
| 6,108,962 A * | 8/2000 | Barron | | 43/42.31 |
| 6,189,256 B1 * | 2/2001 | Boys | | 43/26.2 |
| 6,192,617 B1 * | 2/2001 | Lyles | | 43/42.31 |
| 6,195,930 B1 * | 3/2001 | Sato | | 43/42.3 |
| 6,305,120 B1 * | 10/2001 | Boys | | 43/26.2 |
| 6,389,732 B1 * | 5/2002 | Daniel | | 43/26.1 |
| 6,389,735 B1 * | 5/2002 | Holt | | 43/17.1 |
| 6,449,895 B1 * | 9/2002 | Zabihi | | 43/21 |
| 6,581,319 B2 * | 6/2003 | West | | 43/26.2 |
| 6,647,659 B1 * | 11/2003 | King et al. | | 43/17.6 |
| 6,684,556 B1 * | 2/2004 | Arbuckle et al. | | 43/26.2 |
| 6,760,995 B2 * | 7/2004 | Mueller | | 43/26.2 |
| 6,779,291 B2 * | 8/2004 | Arcand | | 43/17.1 |
| 6,789,347 B1 * | 9/2004 | West et al. | | 43/17.1 |
| 6,804,909 B1 * | 10/2004 | West | | 43/17.1 |
| 6,807,766 B1 * | 10/2004 | Hughes et al. | | 43/17.1 |
| 6,820,366 B1 * | 11/2004 | McDermott | | 43/26.2 |
| 6,836,995 B1 * | 1/2005 | Zernov | | 43/26.1 |
| 6,880,287 B2 * | 4/2005 | Eubanks | | 43/42.13 |
| 6,910,294 B1 * | 6/2005 | Talbert | | 43/26.2 |
| 6,920,714 B1 * | 7/2005 | Modglin | | 43/19.2 |
| 6,925,747 B1 * | 8/2005 | Swanson | | 43/26.2 |
| 7,055,280 B2 * | 6/2006 | Shen et al. | | 43/26.1 |
| 7,062,878 B1 * | 6/2006 | Williams, Jr. | | 43/42.31 |
| 7,080,476 B2 * | 7/2006 | King | | 43/42.3 |
| 7,207,135 B1 * | 4/2007 | Williams, Jr. | | 43/42.31 |
| 7,310,905 B2 * | 12/2007 | Merline | | 43/26.2 |
| 7,383,659 B1 * | 6/2008 | Honkanen | | 43/26.2 |
| 2002/0014031 A1 * | 2/2002 | Brinkman | | 43/42.31 |
| 2002/0088165 A1 * | 7/2002 | Walencik | | 43/42.03 |
| 2002/0104250 A1 * | 8/2002 | West | | 43/17.1 |
| 2003/0115788 A1 * | 6/2003 | Arcand | | 43/19.2 |
| 2003/0154642 A1 * | 8/2003 | Johnston | | 43/42.33 |
| 2004/0200125 A1 * | 10/2004 | Albanito et al. | | 43/42.36 |
| 2005/0138857 A1 * | 6/2005 | Markley et al. | | 43/26.2 |
| 2005/0150151 A1 * | 7/2005 | Wiskur | | 43/42.31 |
| 2005/0178043 A1 * | 8/2005 | Markley et al. | | 43/26.1 |
| 2005/0257418 A1 * | 11/2005 | Merline | | 43/26.2 |
| 2006/0010763 A1 * | 1/2006 | Podlewski et al. | | 43/42.31 |
| 2006/0117640 A1 * | 6/2006 | Castaneda | | 43/17.1 |
| 2006/0140421 A1 * | 6/2006 | Swafford | | 43/4.5 |
| 2006/0191185 A1 * | 8/2006 | Hansen | | 43/27.4 |
| 2008/0265088 A1 * | 10/2008 | Choi | | 244/55 |
| 2011/0061287 A1 * | 3/2011 | Ogawa | | 43/42.31 |

FOREIGN PATENT DOCUMENTS

| | | | | |
|---|---|---|---|---|
| EP | 1741335 | A1 * | 1/2007 | |
| FR | 2858180 | A1 * | 2/2005 | |
| GB | 2322530 | A * | 9/1998 | |
| GB | 2333431 | A * | 7/1999 | |
| WO | WO 9503691 | A1 * | 2/1995 | |
| WO | WO 2005084431 | A1 * | 9/2005 | |
| WO | WO 2007047020 | A2 * | 4/2007 | |
| WO | WO 2008151476 | A1 * | 12/2008 | |

* cited by examiner

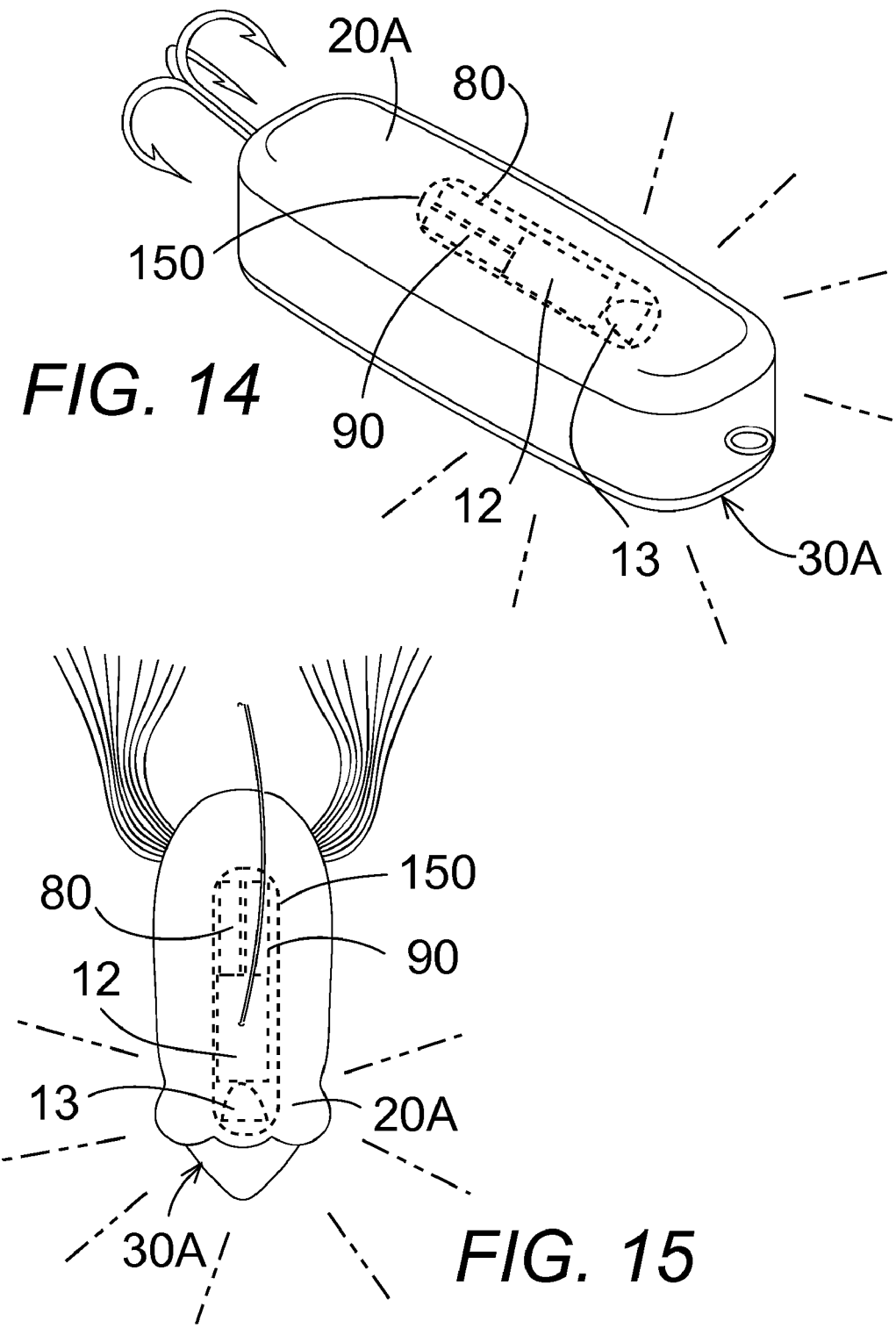

FISHING LURE HAVING RECORDED BAIT SOUND PLAYBACK MODULE

CROSS-REFERENCE TO RELATED APPLICATIONS

The present application is a continuation-in-part of utility patent application Ser. No. 12/171,917 filed Jul. 11, 2008 and Ser. No. 12/562,914 filed Sep. 18, 2009 and Ser. No. 12/945,193 filed Nov. 12, 2010 and Ser. No. 13/189,548 filed Jul. 24, 2011.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to a fishing lure and in particular to a fishing lure device having a sound module broadcasting actual or simulated recorded bait animal sounds from inside a body resembling the size, shape, and optionally the movement of the bait animal in the water.

2. Description of Related Art Including Information Disclosed Under 37 CFR 1.97 and 1.98

In order to be highly effective in catching fish, such as bass, it is necessary to replicate the bait animals, fish, and insects that they prefer for food as closely as possible including sound, shape, and motion.

The prior art remote controlled fishing lures all focus in one way or another on using a cell phone type vibrator motor for vibration only and have no legs or tail that are remote controlled and do not reproduce bait animal sounds. They are often expensive to make and do not rely on simple mechanical operation.

Related prior art patents and published patent applications include U.S. Pat. No. 6,684,556,B1, US20050257418A1, US20040200125A1, U.S. Pat. No. 6,920,714, U.S. Pat. No. 7,055,280, U.S. Pat. No. 6,836,995, U.S. Pat. No. 6,804,909, U.S. Pat. No. 6,789,347, U.S. Pat. No. 6,910,294, US20020014031A1, U.S. Pat. No. 6,449,895, U.S. Pat. No. 6,581,319, U.S. Pat. No. 6,035,574, U.S. Pat. No. 5,894,692, U.S. Pat. No. 5,535,538, U.S. Pat. No. 5,321,905, U.S. Pat. No. 5,105,573, U.S. Pat. No. 4,922,647, U.S. Pat. No. 4,380,132, U.S. Pat. No. 3,841,012, U.S. Pat. No. 7,207,135, U.S. Pat. No. 7,080,476, US20050150151A1, U.S. Pat. No. 6,880,287, US20030115788A1, U.S. Pat. No. 6,779,291, US20030154642A1, US20020104250A1, US20020088165A1, U.S. Pat. No. 6,192,617, U.S. Pat. No. 5,172,510, U.S. Pat. No. 4,980,987, U.S. Pat. No. 4,884,359, U.S. Pat. No. 4,858,370, U.S. Pat. No. 4,700,501, U.S. Pat. No. 4,676,020, U.S. Pat. No. 4,581,841, U.S. Pat. No. 4,594,806, U.S. Pat. No. 4,468,879, U.S. Pat. No. 4,177,597, U.S. Pat. No. 4,133,135, U.S. Pat. No. 3,465,464, U.S. Pat. No. 3,457,667.

What is needed is a fishing lure device containing a sound module which broadcasts the actual or simulated recorded bait creature sound from a replicated bait creature body in the water controlled by the fisherman.

BRIEF SUMMARY OF THE INVENTION

An object of the present invention is to provide fishing lure device containing a sound module which broadcasts the actual or simulated recorded bait creature sound from a replicated bait creature body lure in the water, wherein the sound is preferably produced by a sound module inside the lure via a micro speaker communicating with a micro chip having the recorded actual or simulated sound of the bait creature which is broadcast through the micro speaker when activated by a motion sensing device activated by tugging on the fishing line attached to the lure, which also imparts a movement to the lure.

An alternate object is to produce a fishing lure device containing a sound module which broadcasts the actual or simulated recorded bait creature sound from a replicated bait creature body in the water, wherein the sound is produced by a remote radio controlled robotic fishing lure device replicating bait creatures in size, shape, and movement and transmitting actual or simulated recorded bait creature sounds, which utilizes a simple magnetic actuator and programmable sound device remotely controlled to activate simulated bait creature extremity movement and sounds.

In brief, a primary unique feature of the present invention is embedding a sound module inside a replicated bait creature body, with sound module broadcasts the transmission of a recorded actual or simulated sound of an actual bait creature simply by tugging on the fishing line attached to a simulated bait animal lure to activate a motion sensor to activate a micro recorder to transmit the actual or simulated recorded bait creature sound through a micro speaker while at the same time imparting a motion to the bait creature lure due to the tug on the line.

The sound generating module of the present invention provides a unique combination of resonant inductive charging using a battery protect circuit by inserting the lure with the module in the lure receptacle of the charger, and a water sensing switch for automatically turning the power on and off when the lure is in or out of the water, or a magnetic latch switch which enables turning the power on and off externally with a magnet on the shore or in the boat.

The micro-miniature surface mount technology of the preferred embodiment of the sound module of the present invention does not use discrete components but utilizes surface mount technology making it about 1/10th the size of a discrete component module.

The sound module may either comprise a "slip-in" module inserted in various hollow body soft rubber shaped lures or may be built into hollow plastic shapes. Either type can be made to be either floating or sinking.

Another unique feature of the present invention is the baby alligator shape. There are no lures on the market with this shape. This soft rubber hollow body lure replicates a baby alligator sound and/or shape with soft rubber extremities and may be made without any electronics at all.

There are many lures that can use the technology of the present invention. For bass fishing, some of the basic types of hollow body soft plastic lures envisioned to use the sound modules of the present invention include:

1—e-Bassfrog A frog form which makes a "ribbit" sound and has interchangeable legs.

2—e-Basspop A popper form which makes a "popping chugging" sound and has interchangeable legs.

3—e-Bassgator A hatchling gator form which makes a hatchling gator "squeeking" sound has both legs and a tail that swings side to side.

4—e-Basscrayfish A crayfish form which makes crayfish "clicking" sounds.
5—e-Basschad A chad form which makes chad "rattling buzzing" sounds.

The components for reproducing the actual or simulated sound of the bait creature are encapsulated in a waterproof sound module which is inserted in the hollow simulated bait creature body. The housing is placed within a hollow soft rubber body of whichever shape you choose; frog, gator, crayfish, shad, popper or other bait creature. The lure body can therefore be changed very easily if and when it gets damaged. The sound module insert reproduces the pre-recorded actual or simulated sound of the bait animal.

In the solid body form, the appendages may be removable so that a fisherman can change the legs when they get ripped without having to change the lure body and he can change the legs to the type and color he wishes as conditions change.

The sound module is preferably encapsulated in a material that makes it buoyant or in the case of the crayfish non-buoyant, so the lures can either float or sink depending on the choice of lure type.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings:

FIG. 14 is perspective top view of another embodiment device of the present invention illustrated as a rounded rectangular body with trailing hook showing the internal power source, receiver, and sound transmitter;

FIG. 15 is perspective top view of another embodiment device of the present invention illustrated as a large insect with tail-like streamers showing the internal power source, receiver, and sound transmitter;

DETAILED DESCRIPTION OF THE INVENTION

In FIGS. 1-28, a bait sound producing microchip 12 and 314 and micro speaker 13 and 315 preferably in a waterproof bait creature sound producing module 150 and 300 in a fishing lure 30, 30A, 30B and 30C include self contained electronics inside to broadcast sound reproductions of pre-recorded actual and simulated bait creature sounds appropriate to the shape of the lure when remotely activated by a fisherman, as well as means for creating appropriate motion in the lure.

Figure 18:
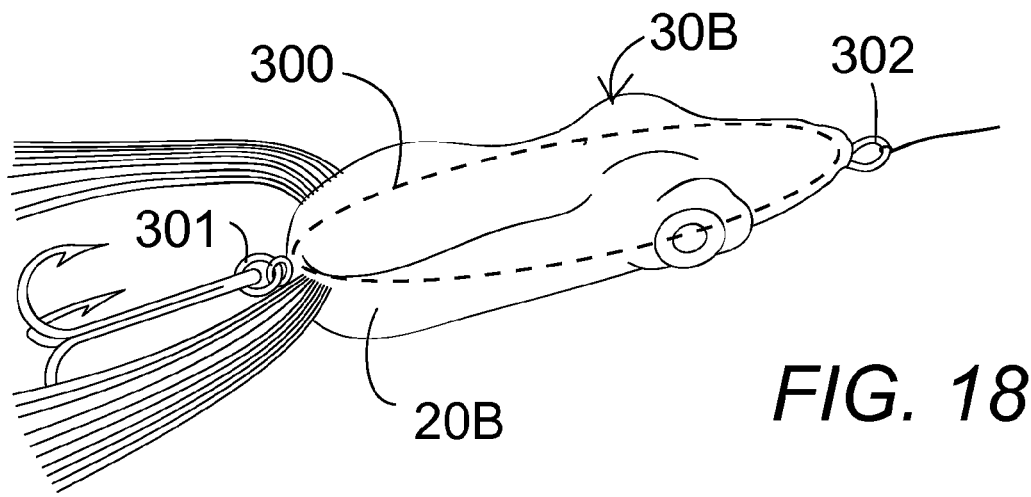
FIG. 18 is perspective top view of the bait sound producing fishing module housed inside a rubberized bait creature body simulating a baby frog or tadpole with tail-like streamers showing the bait creature body floating in water with the tail tilted downward.
Figure 19:
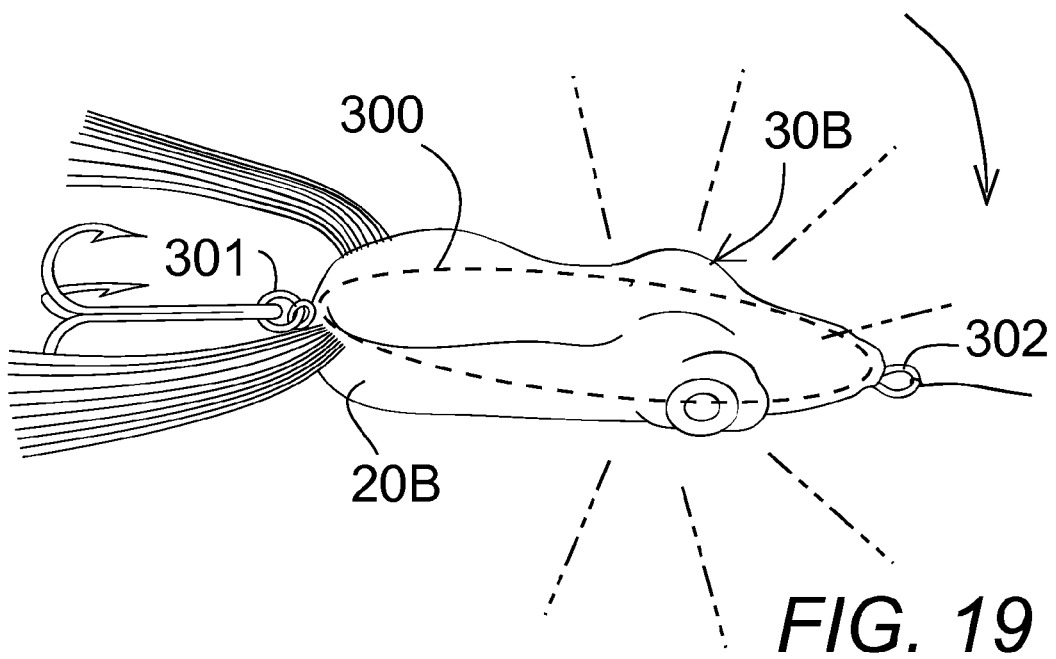
FIG. 19 is perspective top view of the bait sound producing fishing module housed inside the rubberized bait creature body of FIG. 18 showing the bait creature body floating in water with the head tilting downward caused by a tug on the fishing line thereby activating the broadcasting of the recorded bait creature sound from the fishing module.

In FIGS. 21-28, a preferred embodiment of the bait creature sound producing module 300A, and in FIGS. 16-19, another embodiment of the bait sound producing fishing module 300, are each removably housed in a fishing lure device, such as a popper type lure 30C, as shown in FIGS. 23-25 and 28, or a rubberized bait creature body 30B simulating a baby frog or tadpole with tail-like streamers, as shown in FIGS. 18 and 19, each have self contained electronics inside to broadcast an actual or simulated sound reproduction of a bait creature sound when activated by the fisherman.

Each of the watertight bait sound producing modules 300A and 300 is removably inserted inside a fishing lure body 30C and 30B. The bait sound producing module comprises a water proof pod 310 having an exterior water tight housing and an interior space within the housing to house an electronic circuit, a recorded sound producing chip 314 having a pre-recorded bait creature sound recorded thereon, a micro speaker 315 to broadcast the pre-recorded bait creature actual or simulated sound, a power source 311 to power the electronic circuit and the recorded sound producing chip 314 and the micro speaker 315, and means for a fisherman to activate the electronic circuit remotely to activate the pre-recorded bait creature sound on the recorded sound producing chip 314 and broadcast the pre-recorded bait creature sound through the micro speaker 315, with the sound producing module 300A and 300 inside the fishing lure body in the water to attract fish that feed on the bait creature species.

The means for a fisherman to activate the electronic circuit remotely comprises a motion switch 313 inside the module 300A and 300. The motion switch 313 communicates with the electronic circuit and the sound chip 314, so that a tug by a fisherman on a fishing line connected to the fishing lure body at the line receiving ring 302, causes the tilting of the fishing lure to trigger the motion switch to activate the electronic circuit and the chip to produce the pre-recorded sound of the bait creature, as shown in FIGS. 18 and 19.

The fishing lure body 30B preferably simulates the body of the bait creature which produces the sound recorded and reproduced by the sound module in the fishing lure body and the tug on the fishing line creates motion to simulate motion of a bait creature, as shown in FIG. 19.

The sound module 300 and the fishing lure 30B are fabricated of buoyant material to float in the water with a tail end of the fishing lure angled downwardly or a sinking material with the lure sitting on the bottom at an angle, as shown in FIG. 18, so that a tug on the fishing line attached to the front of the floating fishing lure causes the front of the fishing lure to tilt downwardly to trigger the motion switch 313, as shown in FIG. 19.

The recorded sound producing chip 314 generates a pre-recorded simulated or actual sound of a live bait creature sound taken in a natural environment and taken from a list of simulated or actual sounds including a frog ribbit sound, a basspop cricket sound, a baby hatchling alligator squeaking sound, a crayfish clicking sound, a shad rattling buzzing sound, a mouse squeaking sound, a rat squeaking sound, a small fish sound in the water, and an aquatic insect sound in the water.

In FIGS. 21-28, the preferred embodiment power source comprises a rechargeable battery 311 connected to an inductance pickup coil 333A and the lure 30C is removably inserted in a receptacle 335 for receiving the lure in an inductance coupled battery charger 330 comprising a mating inductance coupling coil 333B adjacent to (preferably surrounding) the receptacle so that the coils are in close proximity to charge the battery inside the module 300 without removing the module from the lure.

In FIGS. 23-25 and 28, a popper type lure 30C is dropped into the cup or lure receptacle 335 of the charger 330 and the charger automatically charges the battery 311 in the sound module 300A. The charger runs off 12 Vdc from a wall wart, car cigarette lighter socket or hooked up to the boat power or any 12 Vdc source.

The coupling coil 333B and pickup coil 333A form a resonant tank circuit which detects the AC magnet field created by the external inductance coupled battery charger 330 with a coupling coil 333B. The full wave bridge rectifier (FWBR) 316 converts the AC into DC. This filtered DC is applied to the battery protect circuit 317 which both protects and charges the Lithium battery 311 in a controlled manner.

The charger is in a little cup like fixture and you just have to place the front end of the lure in the cup 335 and it automatically charges the battery in the lure.

The preferred embodiment of FIGS. 21-28 utilizes surface mount technology rather than discrete electronic components to make it about 1/10th the size of a discrete element circuit. It works the same as the discrete one with one exception. You no longer need to have a magnet permanently next to the lure to turn it off.

The sound module of FIGS. 21-25 further comprises an on-off magnetic latch switch 312 so that swiping a South pole of a magnet past the lure activates the sound module circuit for use in the water and swiping a North pole of a magnet past the lure de-activates the sound module circuit for storage. A small pencil size wand with a small magnet on each end is used to turn the power on and off.

A rare earth magnet turns the magnetic actuated latch switch 312 on or off. When the switch is on, it latches a ground on the gate 318, connecting the battery 311 to activate the programmable sound module 314. When the motion switch 313 detects a motion it triggers the sound module 314 to output the stored sound recording to the speaker 315. The sound module is turned on by swiping the South pole of a magnet past magnetic actuated latch switch 312. Swiping the North pole turns it off.

The sound module may be applied either as a "slip-in" to various hollow body soft rubber shapes or built into hollow plastic shapes.

The preferred embodiment provides resonant inductive charging, a battery protect circuit, and a water sensing on-off switch.

Figure 26:
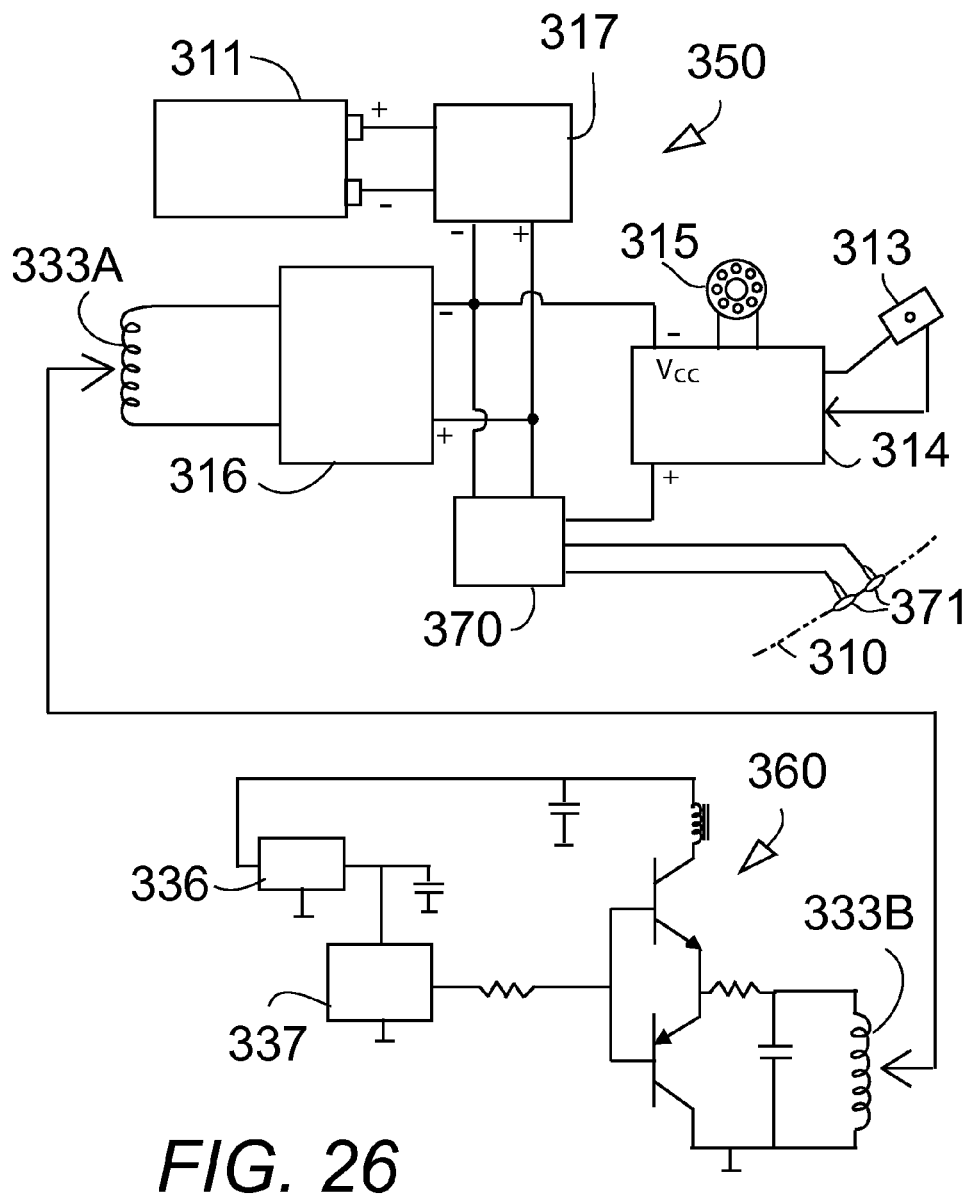
FIG. 26 is a schematic view of the preferred embodiment of the bait sound producing circuit and the charging circuit of the present invention, the sound producing circuit comprising an internal rechargeable battery powering the internal sound recording and playback chip and micro speaker for playing the pre-recorded actual or simulated sound of a bait creature for catching fish and a resonant inductive charging circuitry including an inductance pickup coil, a battery protect circuit and a moisture sensing on-off switch all using micro-miniature surface mount technology, and the inductance coupled battery charger comprising a mating inductance coupling coil positioned so that the coils are in close proximity to charge the battery inside the module and the lure.
Figure 27:
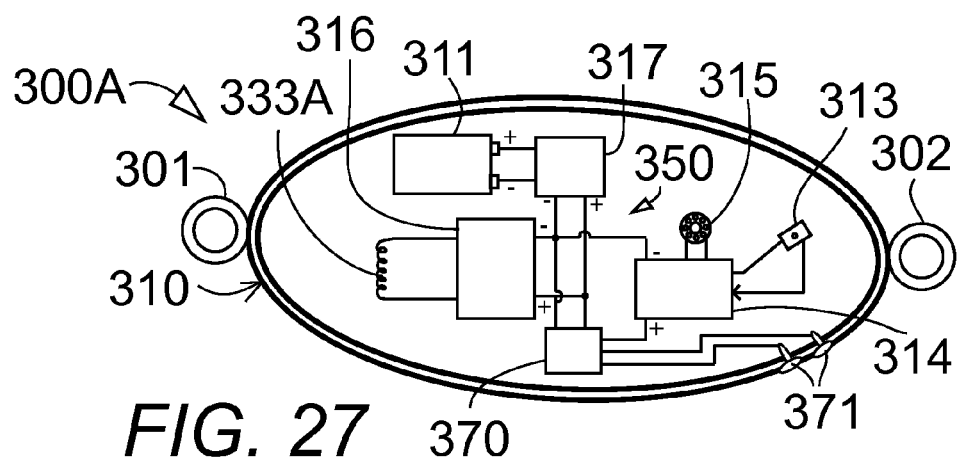
FIG. 27 is a schematic view of the sound module containing the sound producing circuitry of FIG. 26.
Figure 28:
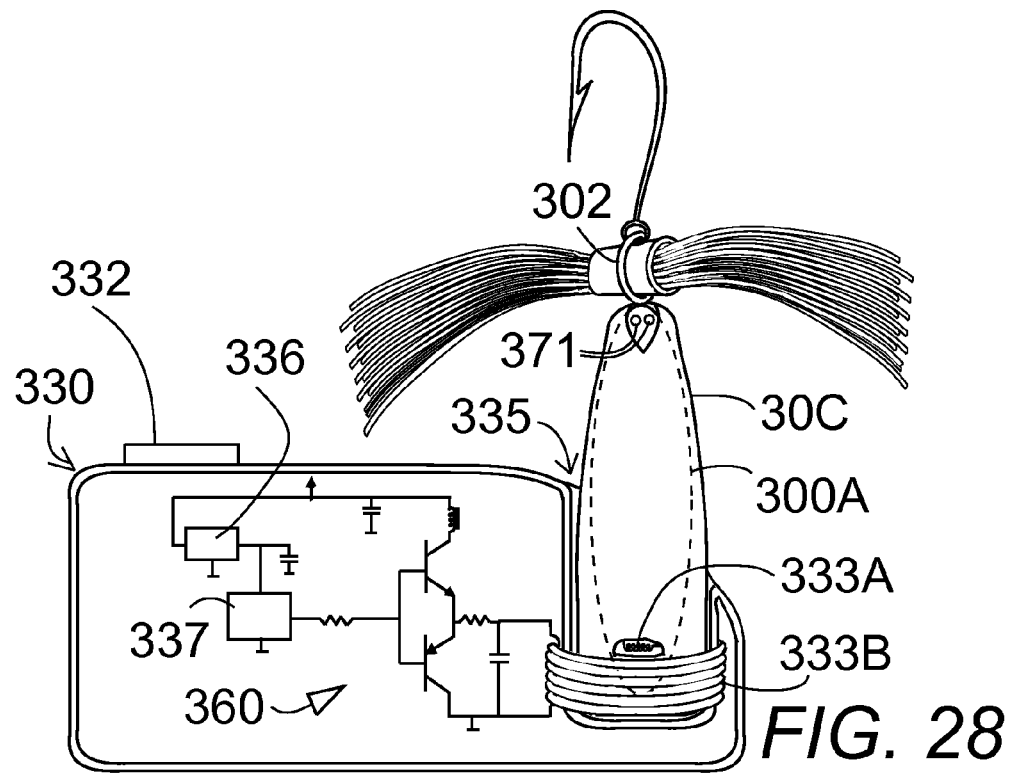
FIG. 28 is a diagrammatic cross-sectional elevation view of the battery charger of the preferred embodiment of the present invention showing the charging circuit of FIG. 26 inside the charger and a receptacle removably containing the lure having the sound producing module of FIG. 27 and showing the inductance pickup coil of the sound module in the lure and the mating inductance coupling coil positioned so that the coils are in close proximity to charge the battery inside the module and the lure.

In FIGS. 26-28, the preferred embodiment of the sound module 300A further comprises a preferred automatic on-off moisture sensing switch 370 having sensing elements 371 mounted externally on the water tight housing 310 of the sound module. The sensing elements 371 communicate with the sound module circuit, having components 313, 314 and 315, so that casting the lure into water activates the sound module circuit for use in the water and removing the lure from the water de-activates the sound module circuit.

The externally mounted sensing elements 371 preferably comprise a pair of closely spaced electrically conductive elements, such as a pair of micro-miniature brass nails through the housing, communicating with an internal electrical component 370, having a transistor, such as a Darlington transistor, in the sound module circuit between the power source 311 and a sound producing portion of the circuit 313, 314, and 315 for activating the recorded sound producing chip 314 to transmit the recorded bait creature sound to the speaker 315 when activated by the motion sensor 313, as one means for a fisherman to activate the electronic circuit remotely. When the sound module 300A is exposed to contact with water in the body of water where the sound module is being used, the sound module is activated into an on mode wherein an electrical current passes through the water between the sensing elements 371 from one of the sensing elements to the other of the sensing elements thereby connecting the power source 311 to the sound producing portion of the circuit 313, 314, and 315 so that the fisherman can remotely activate the sound producing chip 314 as desired. When the sound module 300A is removed from contact with the water the sound module is de-activated into an off mode wherein the sound producing portion of the circuit no longer has power and cannot be activated.

In FIGS. 16-19, the alternate embodiment of the fishing lure body 30B further comprises an alternate battery charging mechanism comprising an electrically conductive means, such as line receiving loop 302, for attaching the fishing line at a forward end and an electrically conductive hook attaching loop 301 for hooking a fish at a rearward end. The power source comprises a rechargeable battery 311, preferably a Lithium Polymer battery which connects to the electrically conductive line receiving loop 302 means for attaching the fishing line and the electrically conductive hook receiving loop 301 means for hooking a fish, so that the rechargeable battery 311 is rechargeable inside the sound module by attaching leads from a lithium battery charger to the two loops without removing the rechargeable battery from the sound module.

The sound module is turned on and off by a magnetic field actuated electronic microcircuit switch inside the sound module that is activated by momentarily placing either the magnetic North or magnetic South end of a magnet in close proximity which causes the switch, and therefore the sound module, to be turned either on or off. When in the off position, the lithium battery contained within the sound module can be recharged by connecting an appropriate lithium battery charger positive (+) lead to the sound module line connection and the negative (−) lead to the sound module hook connection.

Figure 20:
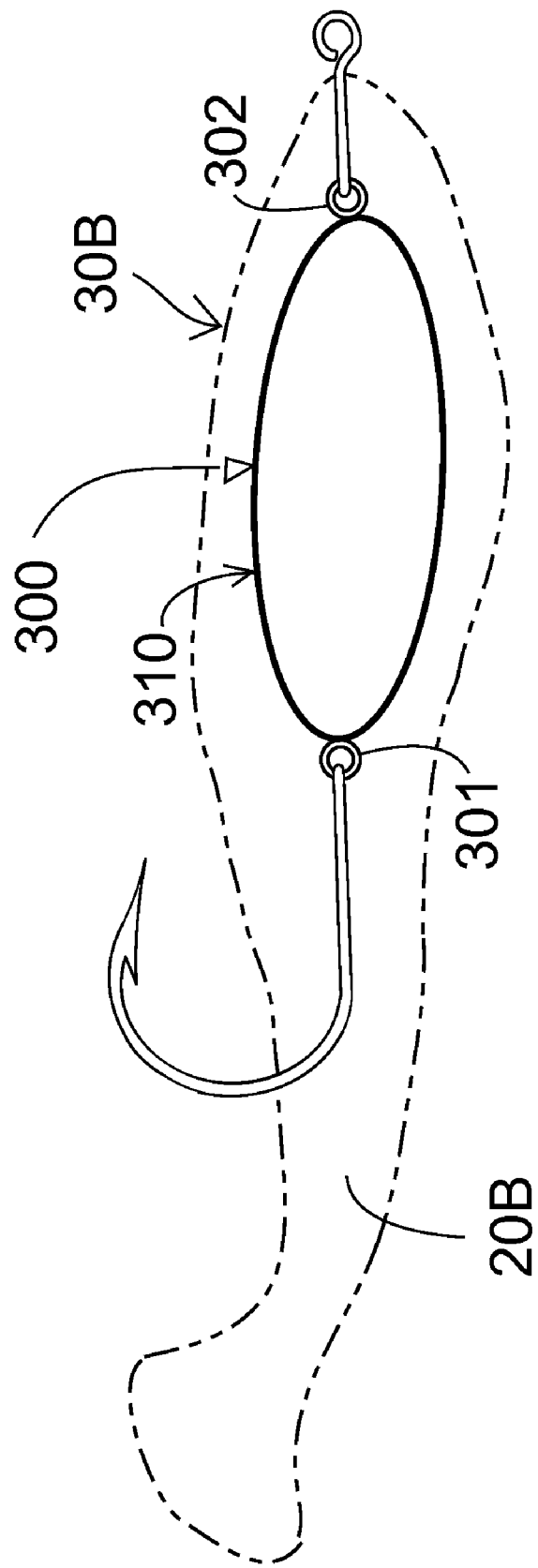
FIG. 20 is a side elevational view of a sound module fit within a soft rubber fishing lure (shown dashed) in the shape of a shad, having a hollow body cavity that the module slips into.
Figure 21:
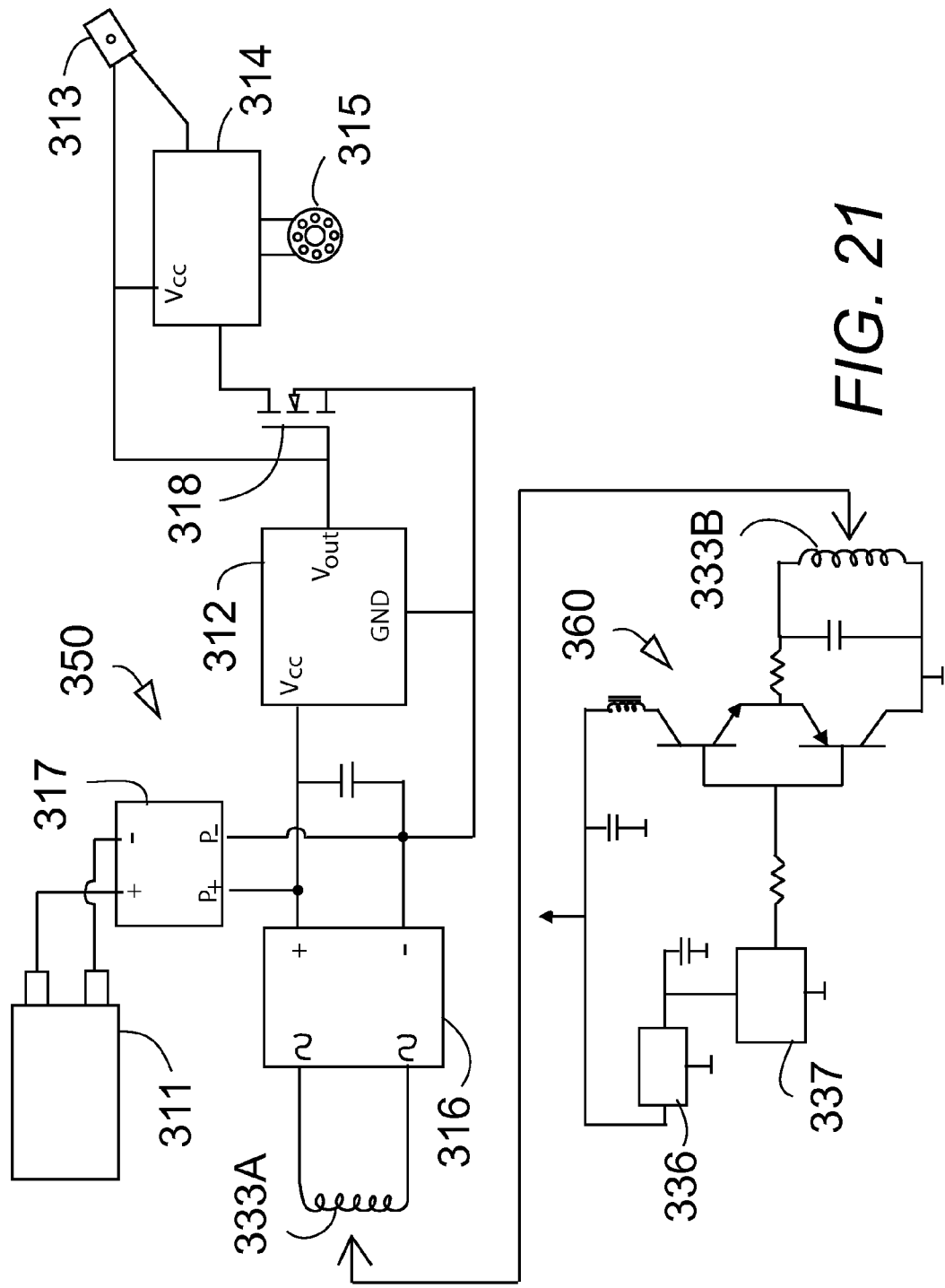
FIG. 21 is a schematic view of the preferred embodiment of the bait sound producing circuit and the charging circuit of the present invention, the sound producing circuit comprising an internal rechargeable battery powering the internal sound recording and playback chip and micro speaker for playing the pre-recorded actual or simulated sound of a bait creature for catching fish and a resonant inductive charging circuitry including an inductance pickup coil, a battery protect circuit and a magnetic latch switch all using micro-miniature surface mount technology, and the inductance coupled battery charger comprising a mating inductance coupling coil positioned so that the coils are in close proximity to charge the battery inside the module and the lure.
Figure 22:
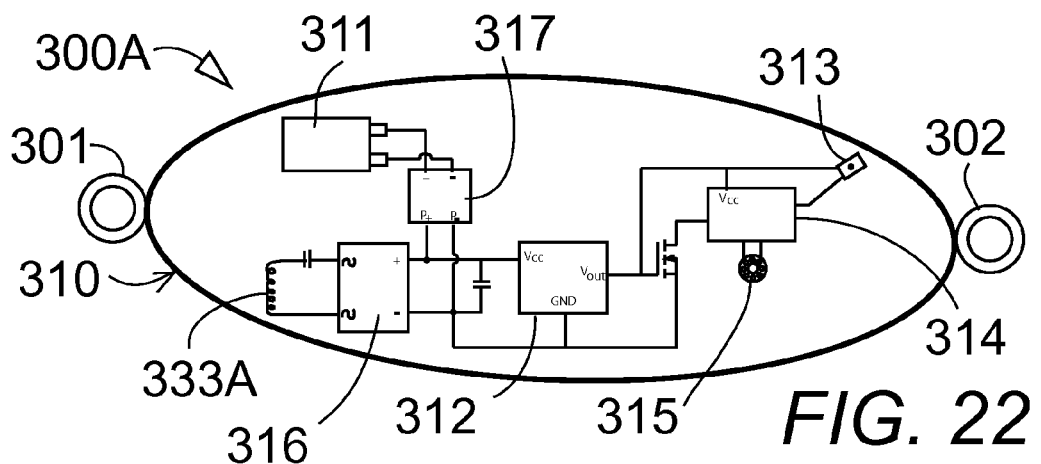
FIG. 22 is a schematic view of the sound module containing the sound producing circuitry of FIG. 21.
Figure 23:
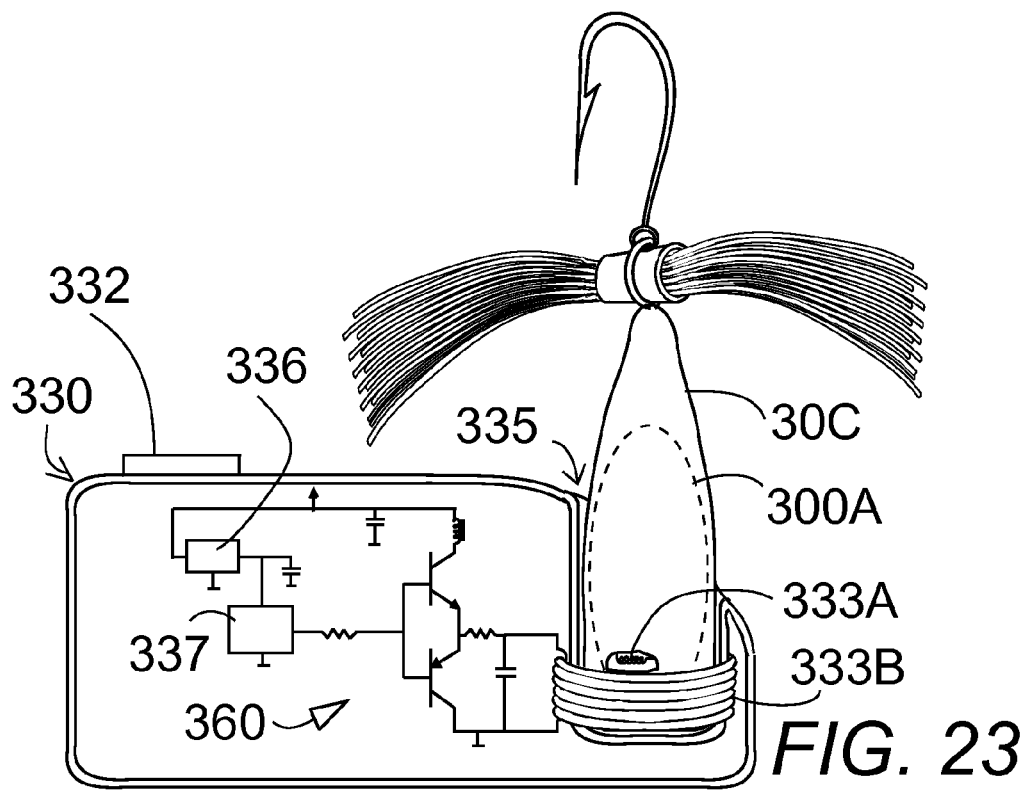
FIG. 23 is a diagrammatic cross-sectional elevation view of the battery charger of the preferred embodiment of the present invention showing the charging circuit of FIG. 21 inside the charger and a receptacle removably containing the lure having the sound producing module of FIG. 22 and showing the inductance pickup coil of the sound module in the lure and the mating inductance coupling coil positioned so that the coils are in close proximity to charge the battery inside the module and the lure.
Figure 24:
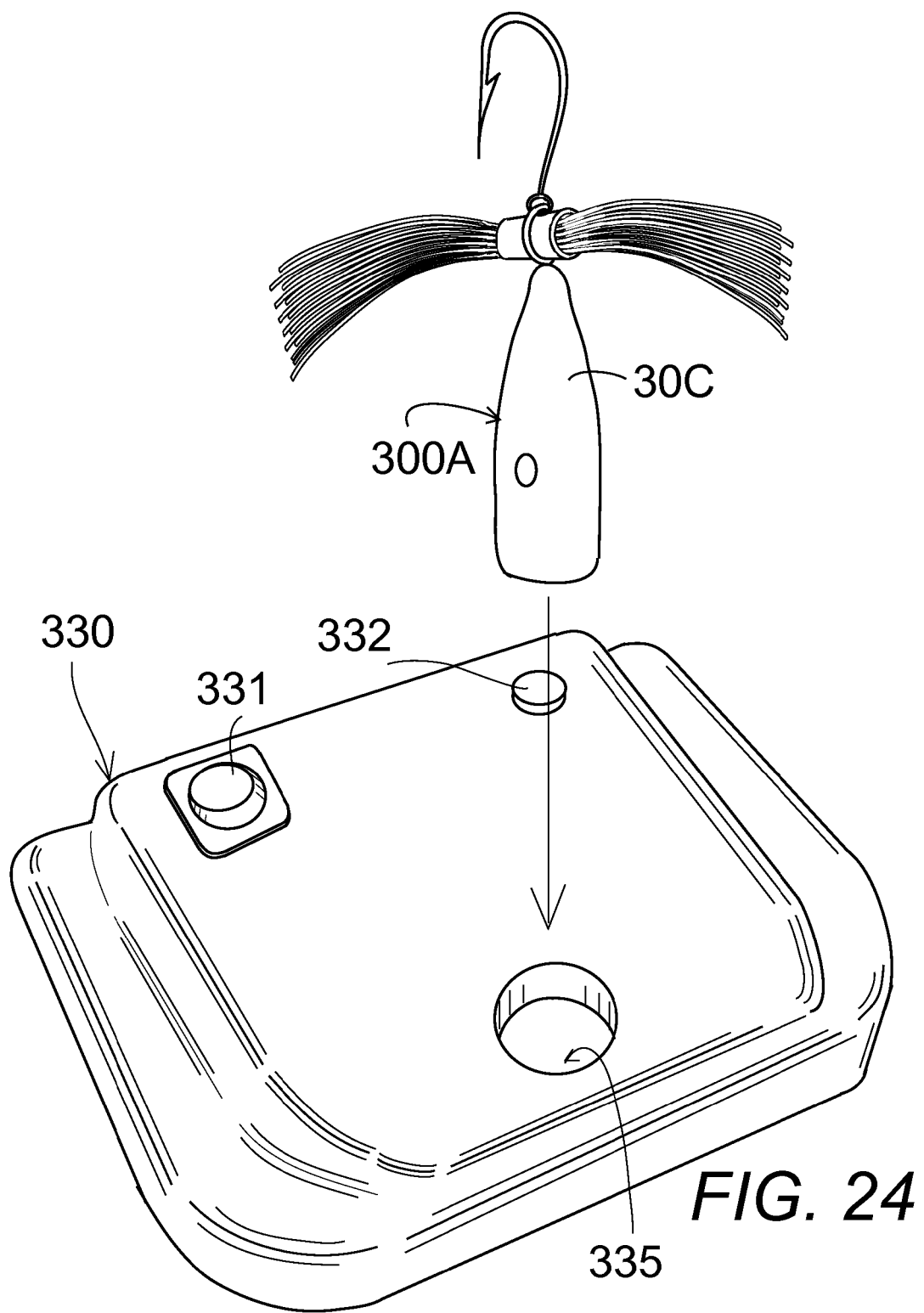
FIG. 24 is a perspective view of the battery charger of FIG. 23 showing the power button and charge indicating light on the top of the battery charger case and the sound producing lure lined up for insertion in the lure receptacle on the top surface of the case.
Figure 25:
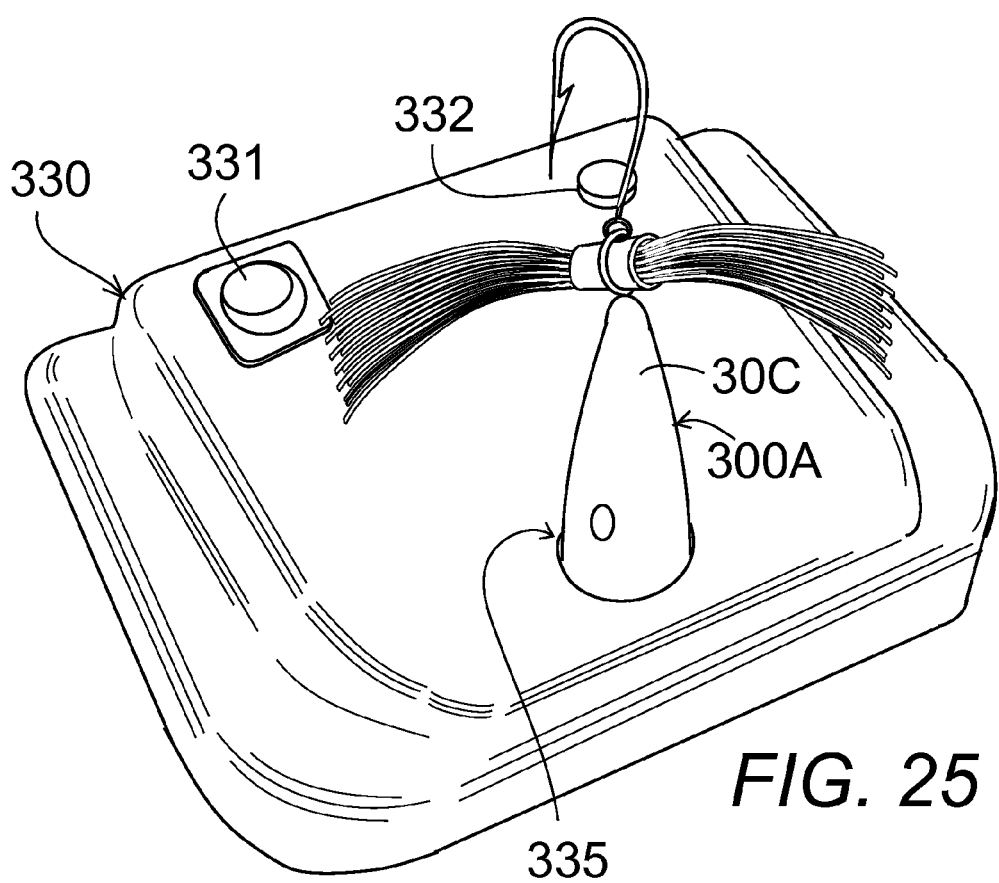
FIG. 25 is a perspective view of the battery charger of FIG. 24 showing the sound producing lure removably inserted in the lure receptacle on the top surface of the case for recharging the battery.

In FIG. 20, a soft rubber shad fish shaped lure 30B has a flexible rubberlike simulated body 20B having a hollow body cavity that the sound module 300 slips into. The form is basically silver colored with a black dot on the side and yellow on the very end of the tail and has red lips. The modules size ranges from 1½" to 2½" long and ½" to ⅝" in diameter and are torpedo shaped. Shad is a small minnow like fish that grows to be perhaps 3 to 4 inches long. They are slim, silver and congregate in large schools. They are the bass 2nd preferred food source after crayfish. They make a sort of rattling, buzzing sound when the bass attacks the school and they flee. They catch bass, catfish, walleye, pike, trout, crappie, anything that can catch them.

In use, the preferred embodiment of the floating lure containing a sound module of the bait creature sought by the type of fish in the water being fished is cast into the area believed to hold bass or other type of fish desired and allowed to sit still for a short time either floating or on the bottom depending on lure choice. At that time the lure will sit in a slightly tail down posture causing the sound module within the lure to be off. When the lure is later "twitched" by a gentle tug on the fishing line connected to the lure to produce motion in the lure to simulate a live bait creature, wherein the lure tips slightly forward causing the motion detection switch within the module to create a electronic trigger signal which turns on the programmable sound I.C. which sends a pre-recorded actual or simulated frog, crayfish, shad, hatchling gator, cricket, or other bait creature sound to a miniature waterproof speaker 315 of the sound module. This causes the lure to both wriggle in the water and to emit an actual or simulated sound of a frog, crayfish, hatchling gator, shad, cricket, or other bait creature.

The Lithium Polymer battery 311 within the sealed module 310 is rechargeable by placing a magnet in close proximity to the built in magnetic reed switch 312. This causes the battery to be connected directly to the front line (+) ring 302 and the rear hook (−) ring 301 for charging. Note: as the battery is not connected to the (+) ring when the module is activated by removing the magnet, the lure can be used in both salt and fresh water without discharging the battery via the water.

The legs of a fisherman's choice, color, shape etc. can be easily inserted into the lure body to simulate the bait creature preferred by the type of fish the fisherman desires to catch.

The electronic sound module may be built in as a part of a complete lure or a sound module can be inserted into a hollow rubber form and when activated causes a pre-recorder frog, crayfish, shad, cricket, gator, or other bait creature sound. When activated the sound module produces an electronic pre-recorded audio actual or simulated sound of a frog, gator, crayfish, shad, cricket, or other bait creature housed in a mating bait creature simulated body matching the bait creature sound produced.

The sound module is a little smaller and the same shape as an adult thumb. What is needed is a lure that closely replicates the size, shape, color and sound of a frog, crayfish, hatchling gator, shad, cricket, or other bait creature which are primary food sources of bass. This lure fills all those needs. A small self contained sealed electronic sound producing module that is activated by a tipping movement of the module.

The lure module has a programmable integrated circuit (I.C.) that is programmed with the recording of the actual or simulated sound of a frog, a hatchling gator, a crayfish, a shad, a cricket, or other bait creature. The module has a magnetic built in reed switch. When a magnet is in close proximity to the switch the sound module is off and the internal Lithium Polymer battery is connected directly to the line connection (+) and the hook connection (−) for charging. When the magnet is removed, the battery is disconnected from the (+) terminal and is connected to the module electronics which turns on the module. When the module is tipped it creates an electronic trigger signal that causes the speaker to emit the pre-recorded sound. The module can be placed within the hollow rubber form of a frog, crayfish, gator, shad, or other bait creature shape of choice or built into a hollow body plastic lure of any shape. Typical hollow lure bodies have the feature wherein the "legs" can be exchanged readily without affecting the module. Note that the stand alone module has no leg slots as the hollow rubber forms contain the slots. When the module is built into a hollow plastic form that form has the leg slots.

In FIGS. 1-19, a remote radio controlled robotic fishing lure device 10 records and plays back a bait creature's actual or simulated recorded sound and also simulates the size, shape, and movement of the bait creature in many embodiments.

Figure 1:
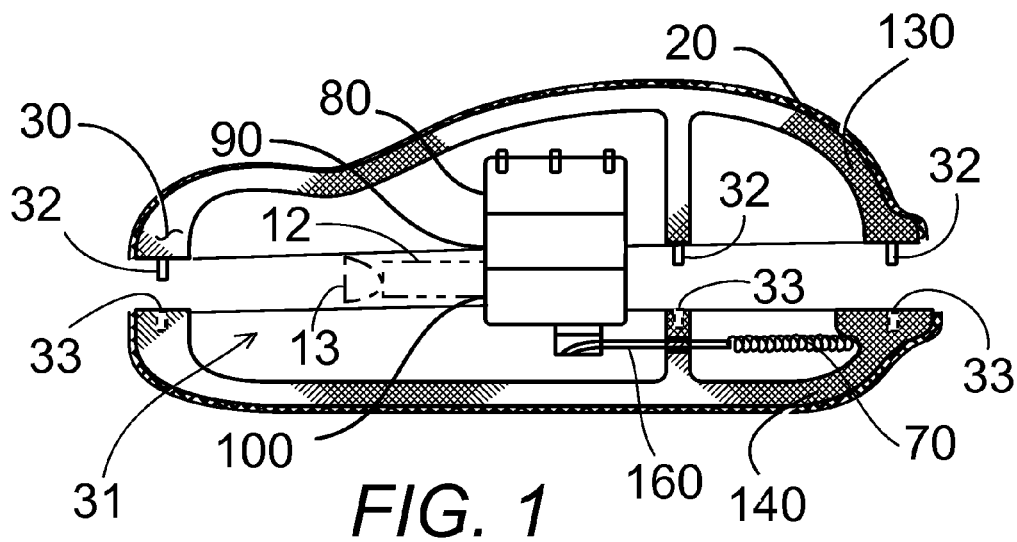
FIG. 1 is a sectional side view of a first embodiment of the invention, illustrating a remote radio controlled artificial fishing lure with legs, to create a fishing lure in a shape that emulates a frog, baby alligator, mouse, rat, aquatic insect, or other chosen shape.

In FIG. 1, a watertight simulated body 30 of a simulated fishing bait creature, a frog in this embodiment, comprises a hard inner upper shell 130 snapped together to a hard inner lower shell 140 each with a rubberized outer covering 20 simulating the outer skin of the bait creature. Pins 32 in one half snap fit into mating holes 33 in the other half. A watertight inner space 31 houses at least one radio receiver 90 and at least one magnetic actuator 100 for creating motion positioned therein. The radio receiver 90 communicates with the magnetic actuator 100. The simulated body 30 has a number of openings 34 around the perimeter for receiving extremities 50 attached thereto in a watertight fit.

The magnetic actuator 100 and 210 may comprise a rare earth magnet actuator or a servo mechanism imparting motion to the control arm.

The power source preferably comprises a rechargeable battery 80 within the lure body having battery charger connections extending outside of the lure body in the fishing line attachment ring and hook attachment ring so that the lure does not have to be taken apart or any inside access necessary at all in order to charge the battery.

The flexible simulated extremities 50 of the fishing bait creature each comprise a soft rubberized replica of an extremity 50 of the fishing bait creature, in this case a frog leg, which fits with a tight watertight fit in one of the openings 34 in the body of the fishing bait creature to plug the opening so that the body is sealed watertight. The magnetic actuator 100 is attached to each of the extremities 50 by means for linking the at least one magnetic actuator to each of the extremities to enable the at least one magnetic actuator 100 to create movement simulating the natural movement of each extremity in the fishing bait creature.

Figure 2:
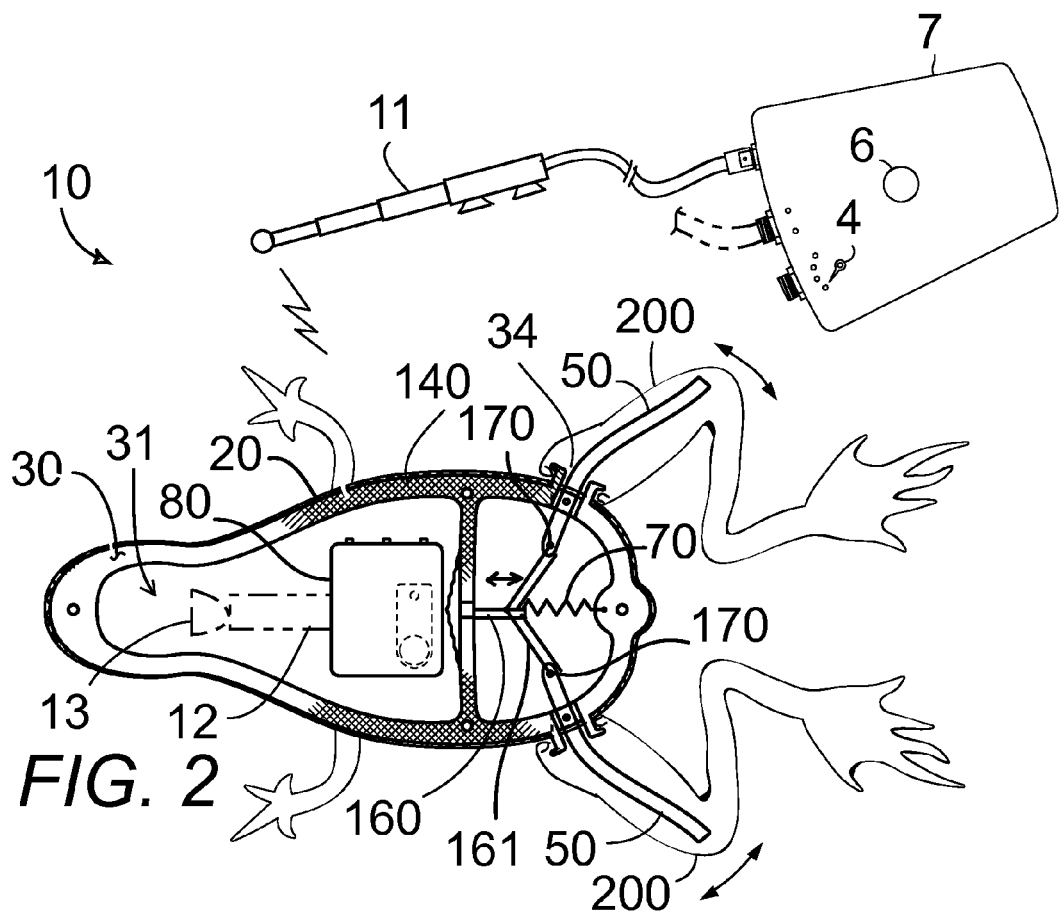
FIG. 2 is a bottom view of the first embodiment of the invention illustrating the various components of the fishing lure.

In FIGS. 1 and 2, a control arm 160 is attached to the magnetic actuator 100 and optional extension control arms 161 connecting to extremity moving arms 50 which extend from inside the simulated body into an extremity 200. Each extremity moving arm 50 is pivotally attached to the control arm wherein the magnetic actuator imparts a back and forth motion (shown by internal arrow) to the control arm 160 and the control arm imparts a movement to the extremity moving arm to create the simulated extremity movement (shown by external arrows). The control arm 160 is further attached to a spring 70 attached to the body to draw the control arm 160 toward the back after the magnetic actuator 100 drawings the control arm 160 forward to create the back and forth motion to move the extremities.

Figure 6:
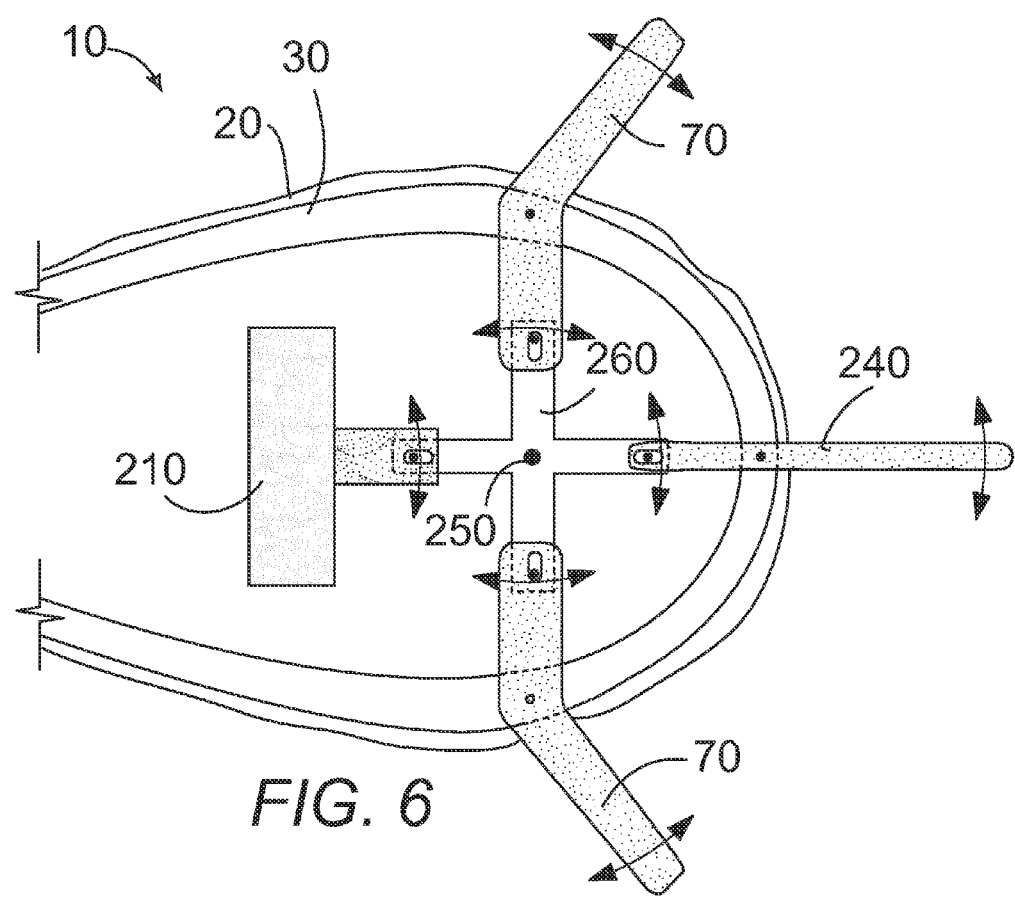
FIG. 6 is a top sectioned view of a third embodiment device.

In FIG. 6, the control arm 260 pivotally attached to the actuator 210 has a plurality of extension control arms which each connect to an extremity moving arm such as leg extremity moving arms 70 and tail extremity moving arm 240 activate an extremity moving arm. The control arm 260 is further attached to a control arm pivot mechanism 250 in the center of the control arm connected to an interior surface of the simulated body.

Figure 3:
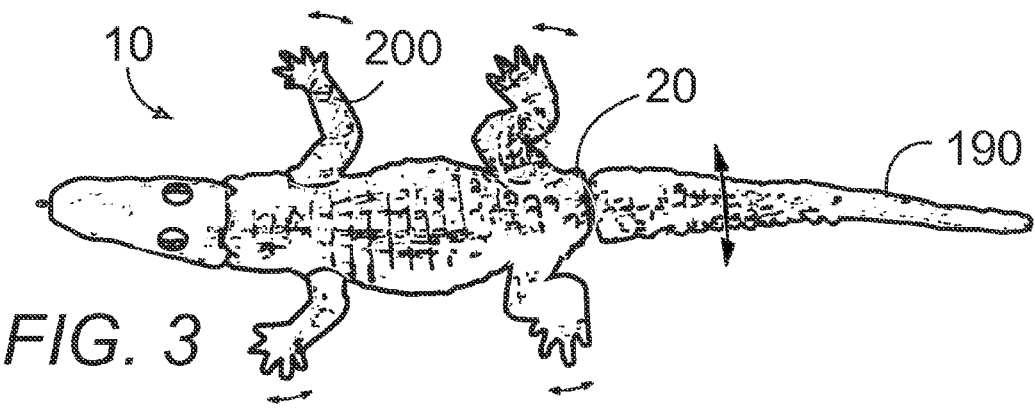
FIG. 3 is perspective top view of a second embodiment device illustrated as an alligator wherein both front legs, both back legs, and the tail can move either independently or in any combination.
Figure 4:
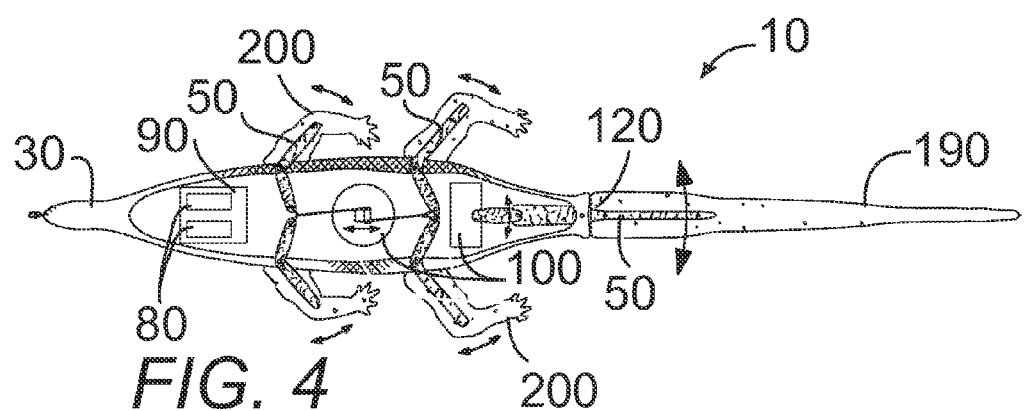
FIG. 4 is a top sectioned view of the second embodiment device.
Figure 5:
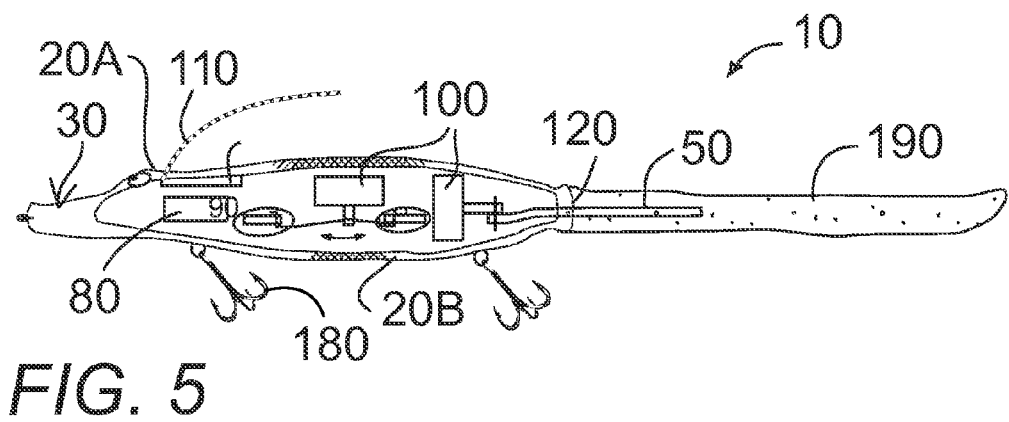
FIG. 5 is a side sectioned view of the second embodiment device.

In FIGS. 1-6, the lure body comprises a molded body in the shape of a bait creature taken from the list of bait creatures comprising a frog in FIGS. 1 and 2, a baby alligator in FIGS. 3-5, a fish, and an aquatic insect.

In FIGS. 1 and 2, the molded body 30 is in the shape of a frog and the extremities 200 comprise simulated frog legs that simulate a kicking motion natural to frog legs so that the extremities simulate a natural swimming motion of a frog in water.

In FIGS. 3-5, the simulated body 30 is in the shape of a baby alligator and the extremities comprise simulated baby alligator legs 200 that simulate a kicking motion natural to baby alligator legs and a simulated baby alligator tail 190 that simulates a natural side to side swinging movement (arrows) of a baby alligator tail so that the extremities simulate a natural swimming motion of a baby alligator in water.

Figure 8:
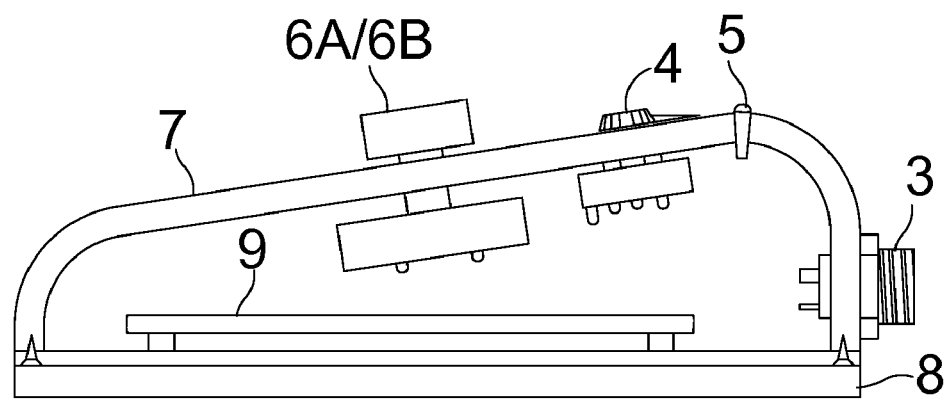
FIG. 8 is a sectional side view of the remote control of FIG. 7.
Figure 9:
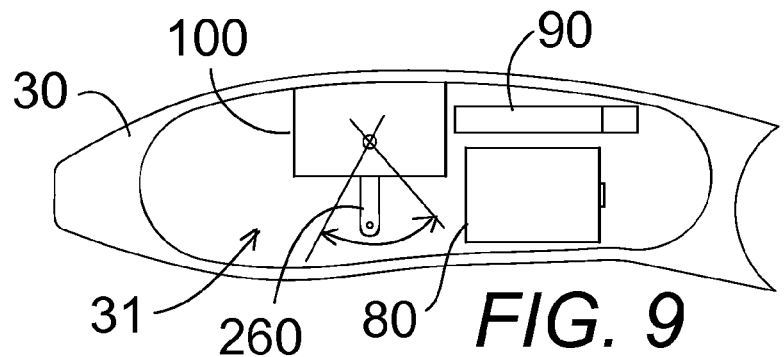
FIG. 9 is a side sectioned view of a basspop body having the radio receiver, batteries, and magnetic actuator with an actuator arm in the body interior.
Figure 10:
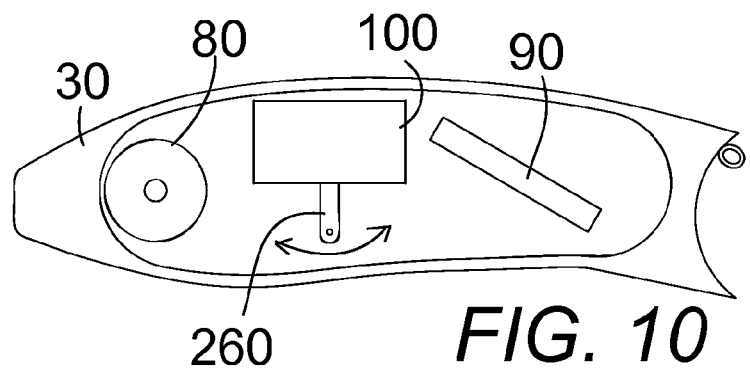
FIG. 10 is a side sectioned view of a basspop body having alternate positioning of the radio receiver, batteries, and magnetic actuator with an actuator arm in the body interior.
Figure 11:
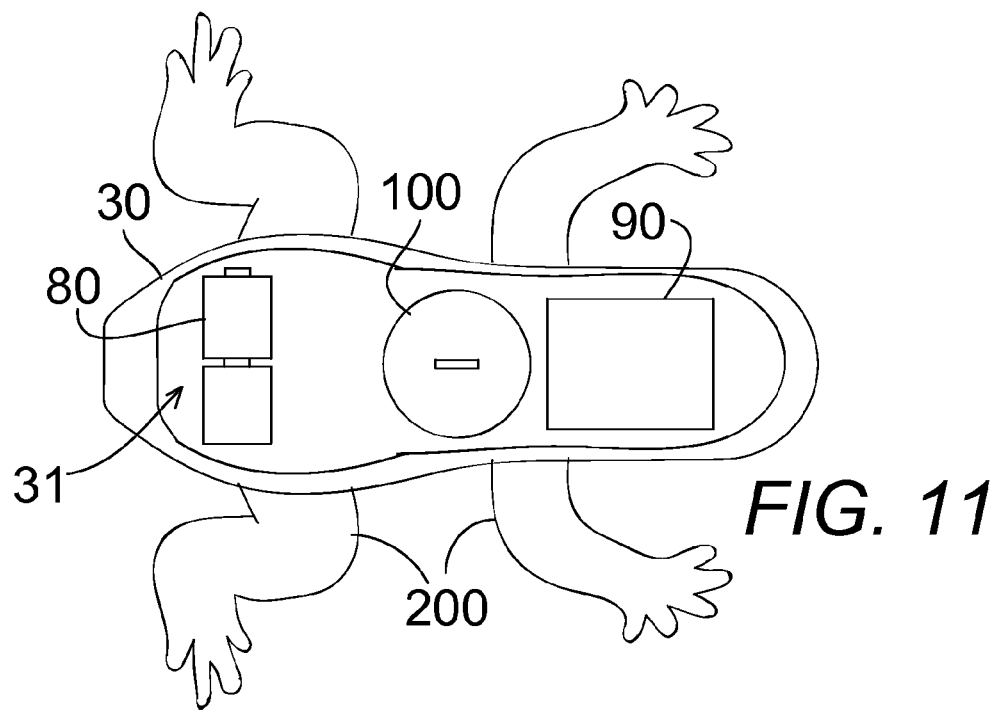
FIG. 11 is a top sectioned view of a basspop body having the radio receiver, batteries, and magnetic actuator with an actuator arm in the body interior and showing the external legs.

In FIGS. 9-11, the simulated body 30 with interior space 31 is in the shape of a basspop and the extremities comprise simulated basspop legs 200 that simulate a kicking motion activated by a control arm 160 attached to a magnetic actuator 100 powered by a battery or batteries 80 and receiving signals through a radio receiver 90 from the remote control (7 as in FIGS. 7 and 8) held by the fisherman.

A sound generating microchip 12 and subminiature speaker 13 for bait animal sound generation on demand are installed within the watertight simulated body 30, the microchip 12 communicating with the radio receiver so that the radio transmitter 9 sends a separate signal activated by a second foot button 6B on the remote control to the radio receiver 90 causing the radio receiver to activate the sound generating microchip 12 to make a pre-recorded sound through the subminiature speaker 13 of a natural recorded sound of the fishing bait creature. The microchip 12 generates a pre-recorded sound depending upon the nature of the fishing bait creature simulated body housing the microchip, the pre-recorded sound is of a live bait animal sound taken in a natural environment and taken from the list of simulated sounds including a frog ribbit sound, a basspop cricket sound, and a baby alligator hatchling squeaking sound.

Figure 7:
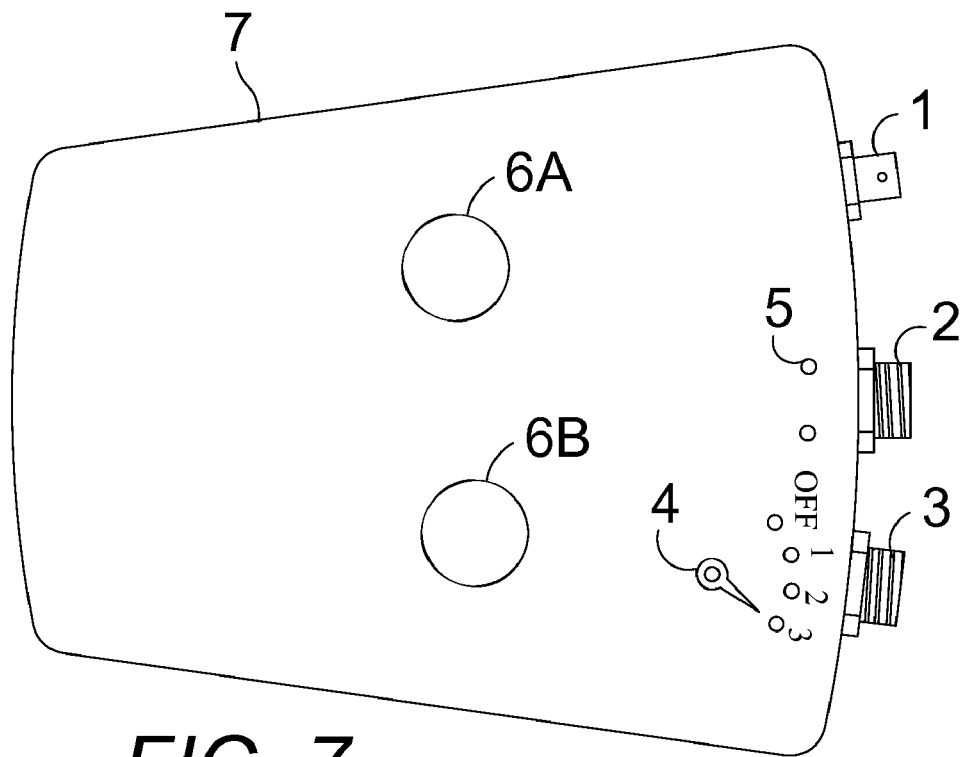
FIG. 7 is a top plan view of the remote control of the present invention.

In FIGS. 7 and 8, a hand and foot operated remote control 7 housing a radio control transmitter 9, the remote control alternately held by a user in a first position for hand control with a hand control switch 4 for turning the magnetic actuator 100 on and off and setting the choice of which robotic lure is being used, and alternately positioned near a foot of a user in a second position for foot control using a first foot actuated button 6A for controlling motion in the robotic lure and a second foot actuated button 6B for controlling sound in the robotic lure while a user holds a fishing rod, the radio control transmitter controlling the robotic fishing lure device for fishing, the radio control transmitter wirelessly communicates with the radio receiver 90 in the simulated body which activates the magnetic actuator 100 to create movement in each of the extremities 50 simulating the natural movement of each extremity in the fishing bait creature. A mating hook and loop fastener patch 8 on the bottom of the remote control allows it to be removable attached to the carpeting on a fishing boat or other convenient location. An antenna is removably attachable to the BNC antenna connector 1 on the remote control. A power source is connectable to the two conductor male power connector 2 on the remote control. The remote control is connectable to a power charge source via a two conductor female charge connector 3 on the remote control. An antenna 11 transmits the radio signals from the remote control to the receiver 90.

In FIGS. 12-15, an alternate watertight simulated body 30A of a simulated fishing bait creature or a similarly sized body, which may be a rubberized body and has a rubberized outer covering 20 simulating the outer skin of the bait creature and each provides a moving outer appendage element which moves as the body is dragged through the water and an internal sound generating housing 150 inserted in the body. The sound generating housing 150 encloses a sound generating microchip 12 and subminiature speaker 13 for bait animal sound generation on demand installed within the watertight simulated body 30. The microchip 12 communicates with the radio receiver 90 so that the radio transmitter 9 sends a separate signal activated by a second foot button 6B on the remote control to the radio receiver 90 causing the radio receiver to activate the sound generating microchip 12 to make a pre-recorded sound through the subminiature speaker 13 of a natural recorded sound of the fishing bait creature. The sound generating housing 150 may be fabricated of buoyant material so that the simulated body 30A floats with the sound generating housing inserted therein. The sound generating housing 150 may be removed and replaced.

Figure 12:
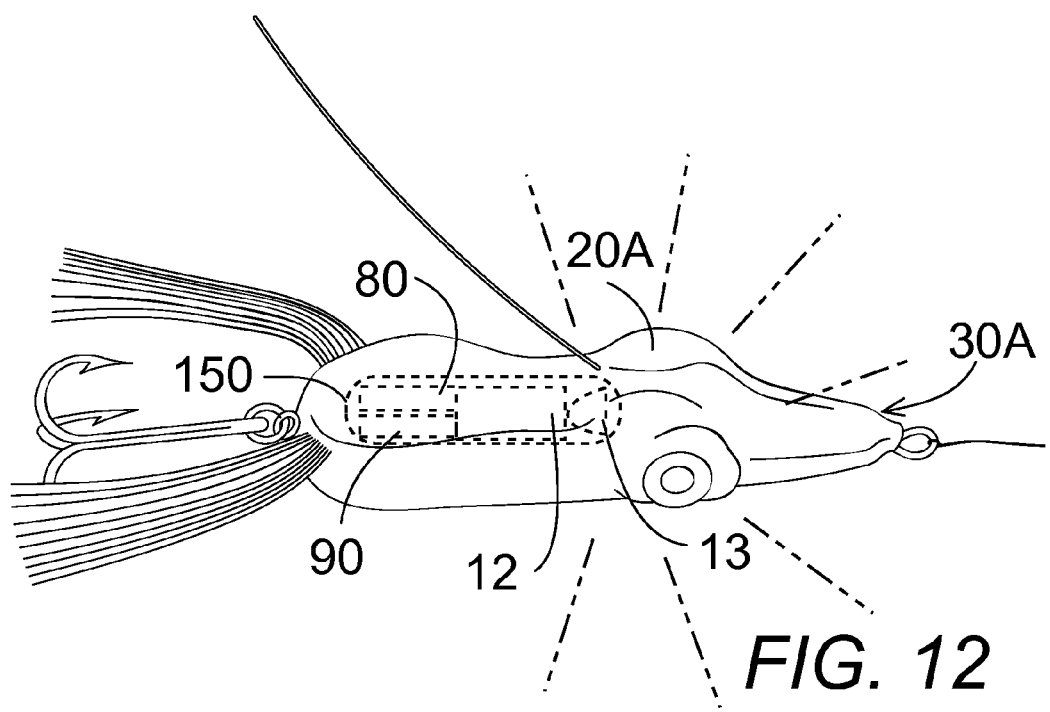
FIG. 12 is perspective top view of another embodiment device of the present invention illustrated as a baby frog or tadpole with tail-like streamers showing the internal power source, receiver, and sound transmitter.

In FIG. 12, the watertight simulated body 30A, having a rubberized outer covering 20A, simulates a baby frog or tadpole with tail-like streamers showing the sound generating housing 150 having an internal power source 80, radio receiver 90, sound generating microchip 12 and sound transmitter, such as a subminiature speaker 13.

Figure 13:
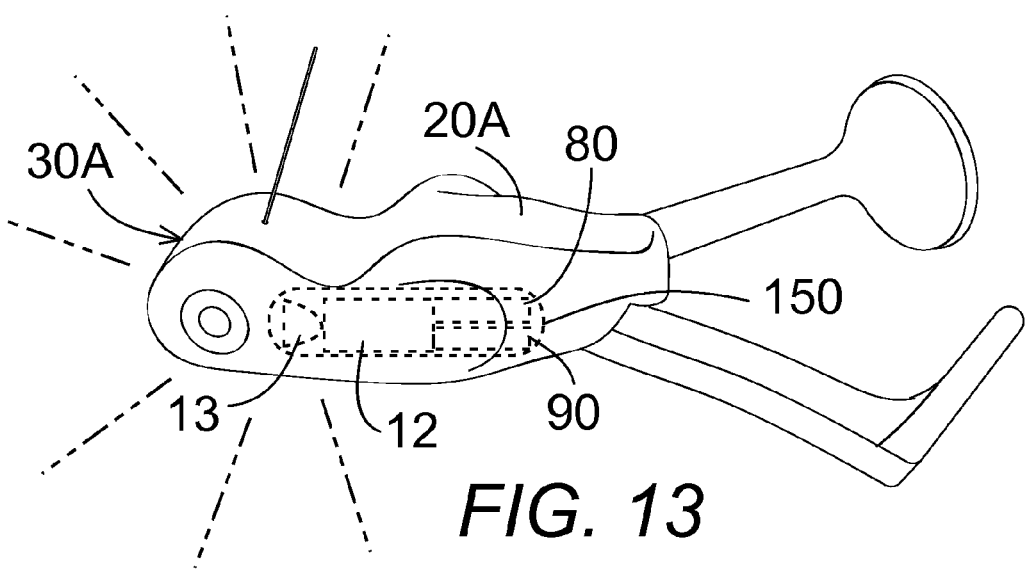
FIG. 13 is perspective top view of another embodiment device of the present invention illustrated as a baby frog with wagging feet showing the internal power source, receiver, and sound transmitter.
Figure 16:
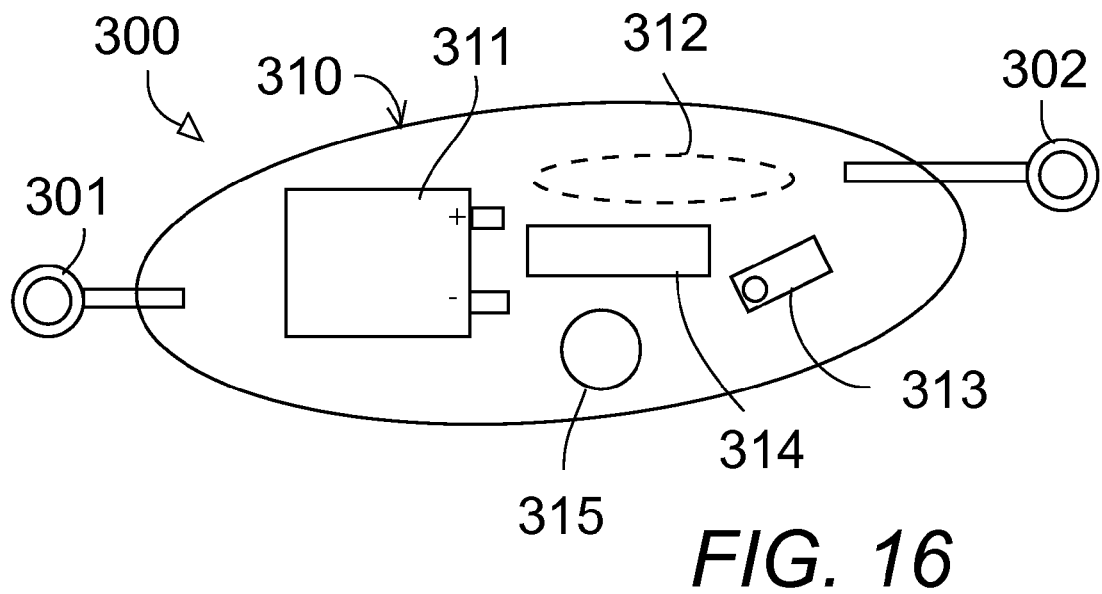
FIG. 16 is a schematic top plan view in section of the bait sound producing fishing module of the present invention showing the interior components and the two conductive end extensions used in charging the internal battery powering the internal sound recording and playback chip and micro speaker for playing the pre-recorded actual or simulated sound of a bait creature for catching fish.
Figure 17:
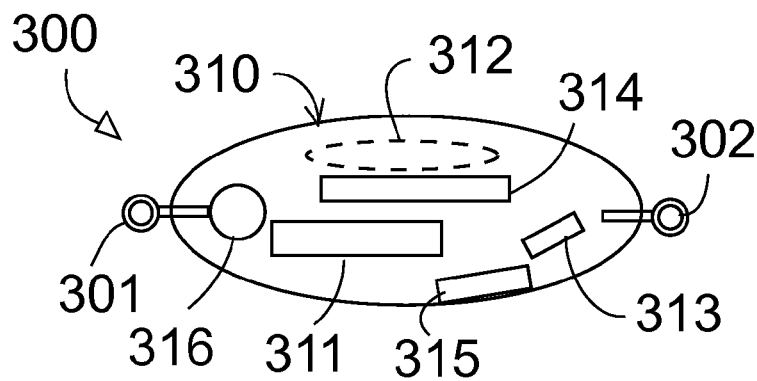
FIG. 17 is a schematic side elevational view in section of the bait sound producing fishing module of FIG. 16.

In FIG. 13, the watertight simulated body 30A, having a rubberized outer covering 20A, simulates a baby frog with wagging feet showing the sound generating housing 150 having an internal power source 80, radio receiver 90, sound generating microchip 12 and sound transmitter, such as a subminiature speaker 13.

In FIG. 14, the watertight simulated body 30A as a rounded rectangular body, having a rubberized outer covering 20A, simulates the size of a fishing bait creature with trailing hook wagging behind, showing the sound generating housing 150 having an internal power source 80, radio receiver 90, sound generating microchip 12 and sound transmitter, such as a subminiature speaker 13.

In FIG. 15, the watertight simulated body 30A as a rounded rectangular body, having a rubberized outer covering 20A, simulates a large insect with tail-like streamers showing the sound generating housing 150 having an internal power source 80, radio receiver 90, sound generating microchip 12 and sound transmitter, such as a subminiature speaker 13.

In use, the watertight simulated body 30 and 30A of the radio controlled fishing bait creature is attached to a fishing line and cast into the water. The remote control 7 is turned on and adjusted to the desired choice of robotic lure being used with the manual control 4. The remote control may be placed on the ground fishing boat carpet or attached to a bait box on the ground and operated by a foot of a user on the foot control buttons 6A and 6B while the fisherman holds the fishing rod and reel with two hands. The bottom hooks 180 hook a fish attacking the lure.

It is understood that the preceding description is given merely by way of illustration and not in limitation of the invention and that various modifications may be made thereto without departing from the spirit of the invention as claimed.

What is claimed is:

1. A bait sound producing fishing module in a fishing lure device having self contained electronics inside to broadcast sound reproduction of actual and simulated bait creature sounds when activated by a fisherman, the device comprising:

a water tight bait sound producing module removably inserted inside a fishing lure body, the bait sound producing module comprising a water proof pod having an exterior water tight housing and an interior space within the housing to house an electronic circuit, the electronic circuit comprising:
  a recorded sound producing chip having a pre-recorded bait creature sound recorded thereon,
  a micro speaker to broadcast the pre-recorded bait creature sound connected to the recorded sound producing chip,
  a power source connected to the electronic circuit and the recorded sound producing chip,
  the power source comprising a rechargeable battery within the fishing lure body connected to a first inductance pickup coil;
a battery charger comprising a second inductance coupling coil adjacent a receptacle;
wherein the receptacle is shaped to receive the fishing lure body;
means for a fisherman to activate the electronic circuit remotely comprising:
  a motion switch communicating with the electronic circuit and the recorded sound producing chip, so that a tug by the fisherman on a fishing line connected to the fishing lure body causes tilting of the fishing lure body to trigger the motion switch to activate the electronic circuit to produce the pre-recorded bait creature sound and create motion in the fishing lure body to simulate the motion of a bait creature;
an automatic on-off moisture sensing switch having water sensing elements mounted externally on the water tight housing of the sound module, the water sensing elements communicating with the electronic circuit so that casting the fishing lure body into water activates the electronic circuit for use in the water and removing the fishing lure body from the water de-activates the electronic circuit; thereby providing the bait sound producing module in the fishing lure device having the self contained electronics inside the module to broadcast the sound reproduction of actual and simulated bait creature sounds and motion when cast into a body of water and activated by the fisherman.

\* \* \* \* \*